United States Patent
Cho et al.

(10) Patent No.: US 11,093,438 B2
(45) Date of Patent: Aug. 17, 2021

(54) PIPELINING MULTI-DIRECTIONAL REDUCTION

(71) Applicant: INTERNATIONAL BUSINESS MACHINES CORPORATION, Armonk, NY (US)

(72) Inventors: Minsik Cho, Austin, TX (US); Ulrich Finkler, Mahopac, NY (US); David Kung, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 16/241,765

(22) Filed: Jan. 7, 2019

(65) Prior Publication Data
US 2020/0218689 A1  Jul. 9, 2020

(51) Int. Cl.
*G06F 9/38* (2018.01)
*G06F 15/78* (2006.01)
*G06F 15/173* (2006.01)

(52) U.S. Cl.
CPC ........ *G06F 15/7878* (2013.01); *G06F 9/3851* (2013.01); *G06F 9/3867* (2013.01); *G06F 15/17318* (2013.01)

(58) Field of Classification Search
CPC .................................................. G06F 15/7878
See application file for complete search history.

(56) References Cited

U.S. PATENT DOCUMENTS

| | | | |
|---|---|---|---|
| 9,178,513 B1 | 11/2015 | Hutton et al. | |
| 9,626,192 B2 * | 4/2017 | Forsyth | G06F 12/0875 |
| 9,632,777 B2 * | 4/2017 | Fleischer | G06F 9/30036 |
| 9,792,160 B2 | 10/2017 | Shear et al. | |
| 2005/0188178 A1 * | 8/2005 | Saida | G06F 9/3834 712/2 |
| 2009/0307467 A1 * | 12/2009 | Faraj | G06F 9/54 712/225 |
| 2018/0322386 A1 * | 11/2018 | Sridharan | G06T 15/005 |

OTHER PUBLICATIONS

Authors et. al.: Disclosed Anonymously, IPCOM000249223D, Dynamic Deployment Chains in a Hybrid Cloud Environment Feb. 10, 2017 (3 Pages).
Authors et. al.: Disclosed Anonymously, IPCOM000207221D, Dynamic Runtime Optimization of Software Component Deployment May 19, 2011 ( 1 Page ).
Zhao, Y. et al., Efficient Communications in Training Large Scale Neural Networks Feb. 2017 (104 Pages).

* cited by examiner

*Primary Examiner* — Michael Sun
(74) *Attorney, Agent, or Firm* — Griffiths & Seaton PLLC

(57) ABSTRACT

Embodiments for pipelining multi-directional reduction by one or more processors in a computing system. One or more reduce scatter operations and one or more all-gather operations may be assigned to each of a plurality of independent networks. The one or more reduce scatter operations and the one or more all-gather operations may be sequentially executed in each of the plurality of independent networks according to a serialized execution order and a defined time period.

20 Claims, 7 Drawing Sheets

PIPELINING MULTI-DIRECTIONAL REDUCTION

BACKGROUND OF THE INVENTION

Field of the Invention

The present invention relates in general to computing systems, and more particularly to, various embodiments for pipelining multi-directional reduction in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for pipelining multi-directional reduction by a processor, are provided. In one embodiment, by way of example only, a method for pipelining multi-directional reduction in a computing system, again by a processor, is provided. One or more reduce scatter operations and one or more all-gather operations may be assigned to each of a plurality of independent networks. The one or more reduce scatter operations and the one or more all-gather operations may be sequentially executed in each of the plurality of independent networks according to a serialized execution order and a defined time period.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
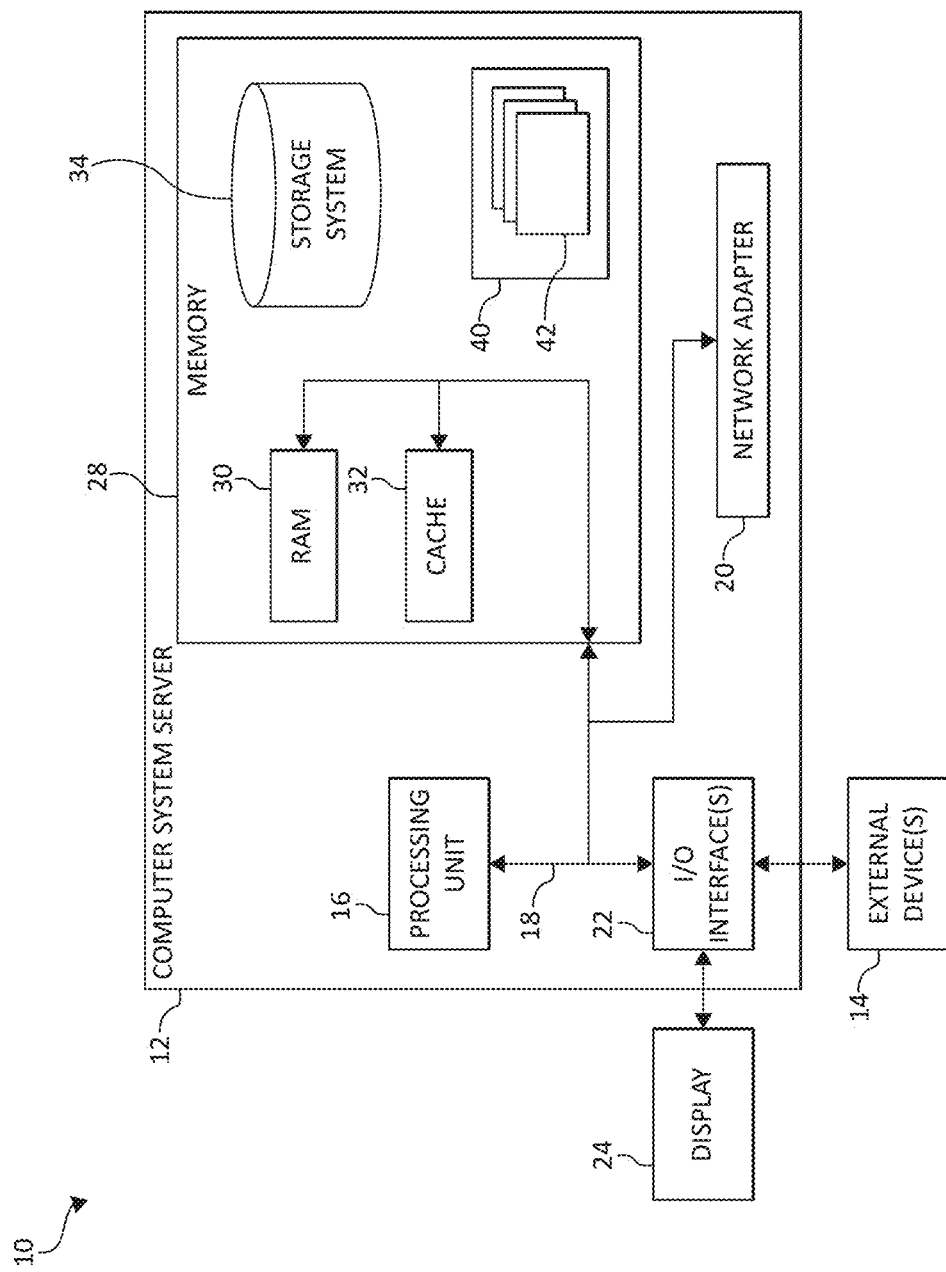
FIG. 1 is a block diagram depicting an exemplary cloud computing node according to an embodiment of the present invention.

The present invention relates generally to the field of deep learning, and more specifically to executing multi-directional reduction in deep-learning implementations. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Any or all of the data utilized and created in a deep-learning system may be transmitted across one or more networks, may subsequently be subject to any limitations of said one or more networks. In particular, with respect to large scale deep-learning systems, any network communication may be subject to a bottleneck due to a large number of learners, the frequency of data exchange across the network, and the volume of the data being exchanged. Furthermore, communication across a multi-tiered network can be largely inefficient, as the weakest link or node in the network will largely dictate how the network will perform as a whole.

One approach to increasing efficiency in large scale deep-learning systems is to employ data reduction techniques. Reduce functions are a classical concept from functional programming that effectively reduce an initial set of numbers into a smaller set of numbers via a function. Some existing programming functions enable data reduction across multiple processes, with the result returned either to the root process in some cases or to all of the processes involved in other cases.

When training a deep learning system onto multiple graphics processing unit ("GPUs") in parallel, choices must be made regarding how to distribute operations to be executed across the available GPUs. Each GPU then runs forward propagation of the network on its own data, as well as error backpropagation to determine a gradient of loss with respect to any existing network parameters. The GPUs then communicate with one another to compute an average gradient and the communication may occur across various networks. The communication may be susceptible to any network limitations each time communication occurs, which can lead to a severe slowdown of data transfer within a deep learning system.

Thus, the present invention provides for increasing efficiency within a deep learning system utilizing an allreduce function while providing pipelining to increase network utilization by performing pipelining multi-directional reduction. In one embodiment, by way of example only, a method for pipelining multi-directional reduction in a computing system, again by a processor, is provided. One or more reduce scatter operations and one or more all-gather operations may be assigned to each of a plurality of independent networks. The one or more reduce scatter operations and the one or more all-gather operations may be sequentially executed in each of the plurality of independent networks according to a serialized execution order and a defined time period.

It is understood in advance that although this disclosure includes a detailed description on cloud computing, implementation of the teachings recited herein are not limited to a cloud computing environment or IoT network environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform selected, identified, and/or defined tasks or implement selected, identified, and/or defined abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
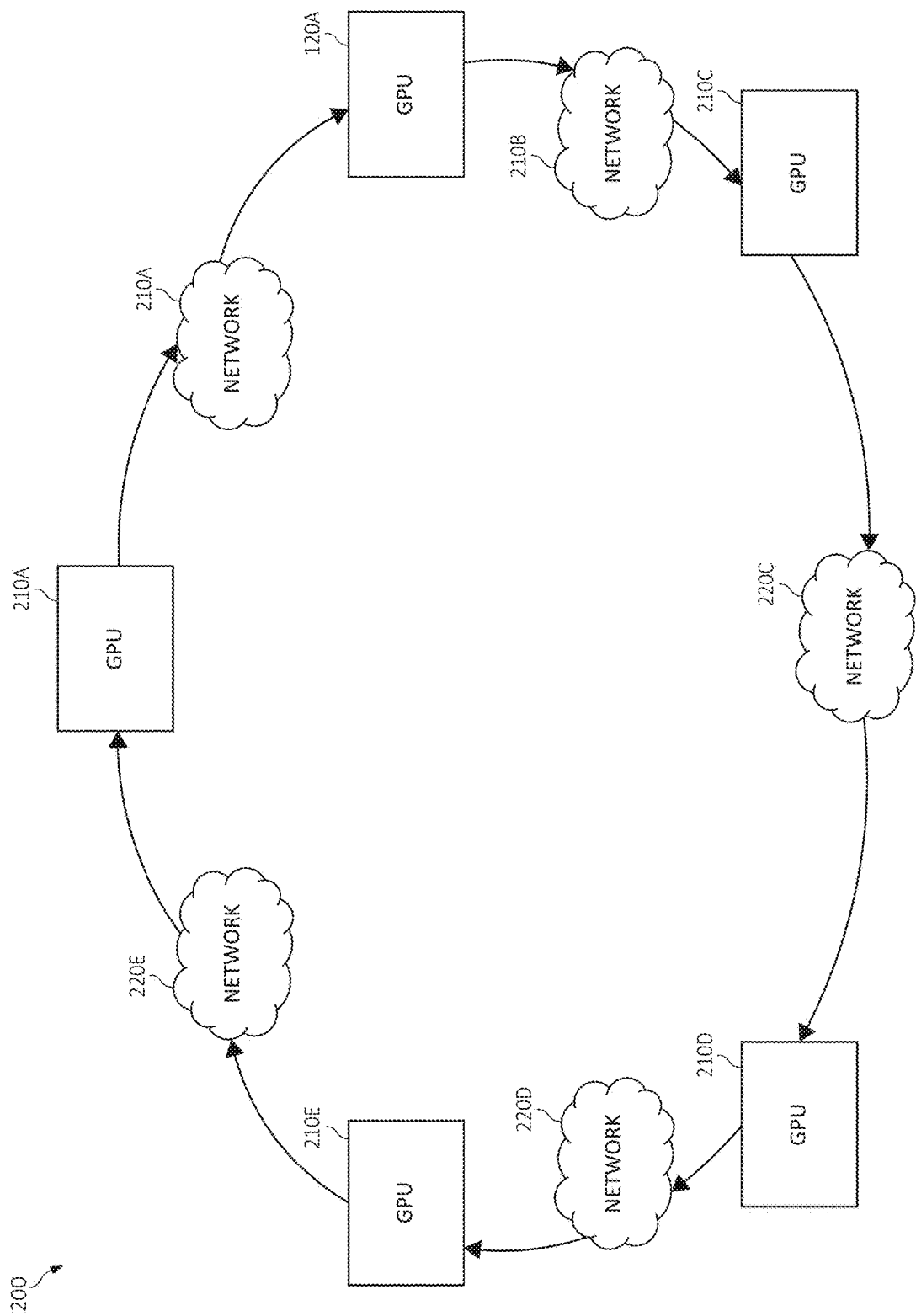
FIG. 2 depicts an example of a deep learning system configured to execute a ring-based allreduce algorithm.

As illustrated, the present invention provides for increasing efficiency within a deep learning system utilizing an allreduce function (e.g., a ring-based allreduce function by way of example only) while providing pipelining to increase network utilization by performing pipelining multi-directional reduction. For example, an allreduce function (e.g., ring-based allreduce function) is an algorithm for which a communication cost within a deep learning system is constant, and is limited only by the slowest connection between GPUs in the system. FIG. 2 depicts an example of a deep learning system configured to execute a ring-based allreduce algorithm. As depicted, deep learning system 200 includes 5 GPUs 210 (210A, 210B, 210C, 210D, and 210E) arranged in a logical ring. Each GPU is connected to its left neighbor and its right neighbor via a network 220. While in the depicted example each pair of GPUs is connected by a separate network (220A, 220B, 220C, 220D, 220E), it should be noted that in other cases some of the GPU pairs may communicate across the same network as other GPU pairs.

In the depicted example, each GPU 210 communicates strictly with its two neighboring GPUs. For example, GPU 210A receives data from GPU 210E and provides data to GPU 210B. In other words, each GPU 210 strictly sends data to its next neighbor and receives data from its previous neighbor. The ring based allreduce algorithm proceeds in two steps, first executing a scatter-reduce algorithm, and then executing an all-gather algorithm. Effectively, the scatter-reduce algorithm initializes the GPUs 210 to exchange data such that each GPU 210 ends up with a piece of the final result. In the scatter-reduce step, each GPU 210 combines the data item it receives from another GPU with a data item existing in its own corresponding chunk or partition. This step is performed iteratively until each GPU contains at least one data element that is representative of an aggregation of the corresponding elements from each partition. After the scatter-reduce step is complete, each GPU 210 has an array of values, some of which are the final values which include contributions from each GPU 210. The all-gather step transmits these final values from one GPU 210 to the next, and replaces the existing value in a GPU 210 with the final value. After the first iteration, each GPU 210 has two chunks or elements of the final reduced array. The all-gather step is executed iteratively until each GPU 210 has each element of the final reduced array.

When executing a ring-based reduction, each transmission step can only be completed as quickly as the most limited network will allow. That is, for each iteration where data elements are exchanged from one GPU to the next, the next iteration cannot begin until a last data element has been transmitted from one GPU 210 to another via the slowest (or most limited) network in the system. The delays introduced by this slowest available network are compounded, as the delay is imposed upon every iteration of the scatter-reduce step and the allreduce step that is executed. The present invention seeks to improve upon this inefficiency by requiring fewer transmissions across the least efficient network.

Figure 3:
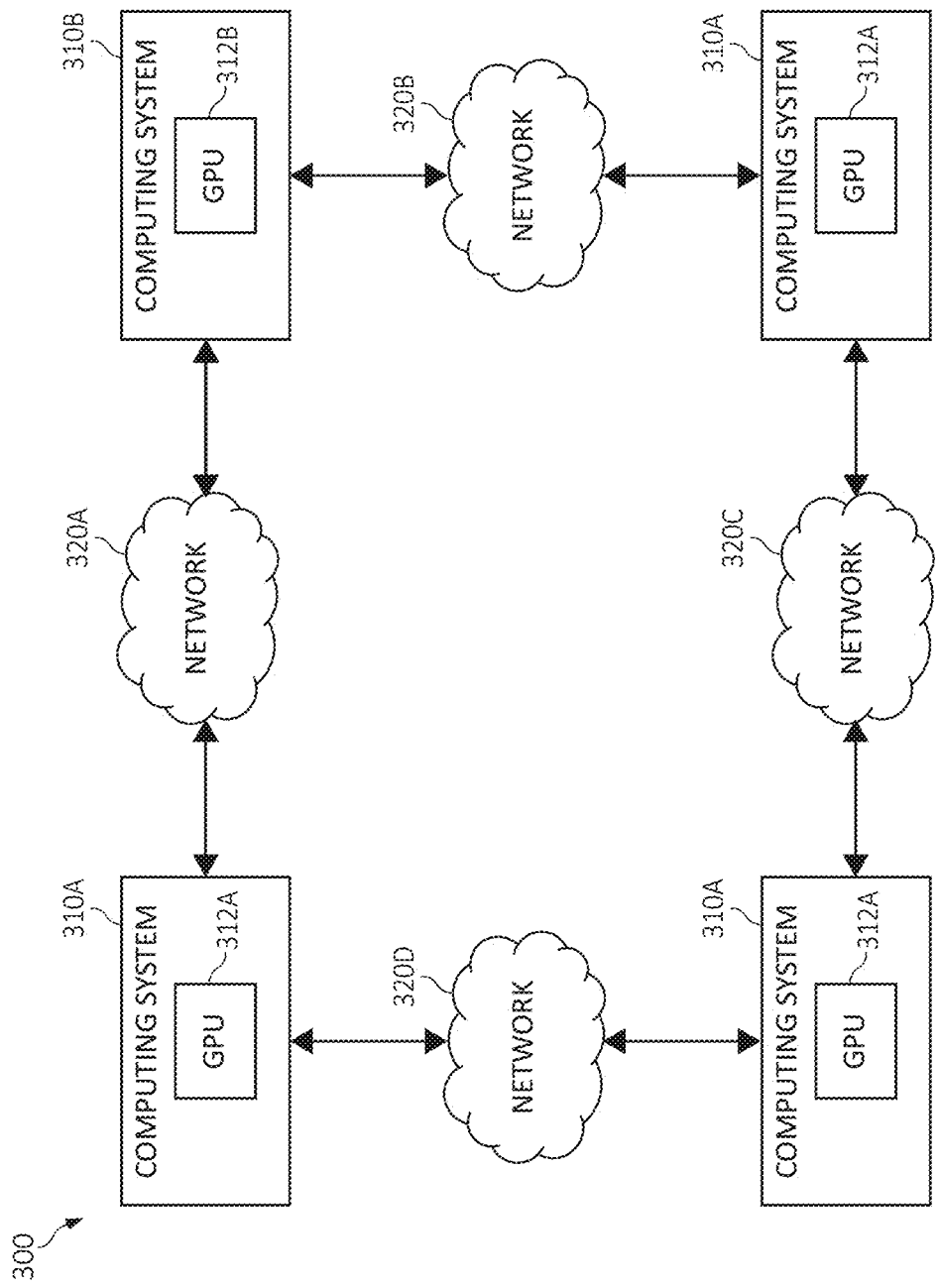
FIG. 3 is a functional block diagram depicting a deep learning system in accordance with some embodiments of the present invention.

FIG. 3 is a functional block diagram depicting a deep learning system 300 in accordance with some embodiments of the present invention. As depicted, deep learning system 300 (e.g., a multidimensional reduction program 300) includes computing systems 310 (i.e., 310A, 310B, 310C, and 310D), a multidimensional reduction program 300, and a plurality of networks 320. In one aspect, the multidimensional reduction program 300 may be used to average a gradient in one or more deep learning systems/implementations. Multidimensional reduction system 300 enables improved efficiency in communication within a deep learning environment.

Computing systems 310 can be desktop computers, laptop computers, specialized computer servers, or any other computer systems known in the art. In some embodiments, computing systems 310 represent computer systems utilizing clustered computers and components to act as a single pool of seamless resources. In general, computing systems 310 are representative of any electronic devices, or combinations of electronic devices, capable of executing machine-readable program instructions, as described in greater detail with regard to FIG. 1.

As depicted, each computing system 310 includes a graphics processing unit (GPU) 312. Each GPU 312 is a circuit designed to manipulate and alter memory to facilitate creation of images for display. In at least one embodiment, GPUs 312 are configured to execute multidimensional reduction algorithms according to a multidimensional reduction method.

Each of networks 320 can be, for example, a local area network (LAN), a wide area network (WAN) such as the Internet, or a combination of the two, and include wired, wireless, or fiber optic connections. In general, networks 320 can be any combination of connections and protocols that will support communications between computing systems 310 in accordance with an embodiment of the present invention. In at least one embodiment of the present invention, networks 320 facilitate data transmissions between computing systems 310 within a deep learning system 300.

Figure 4:
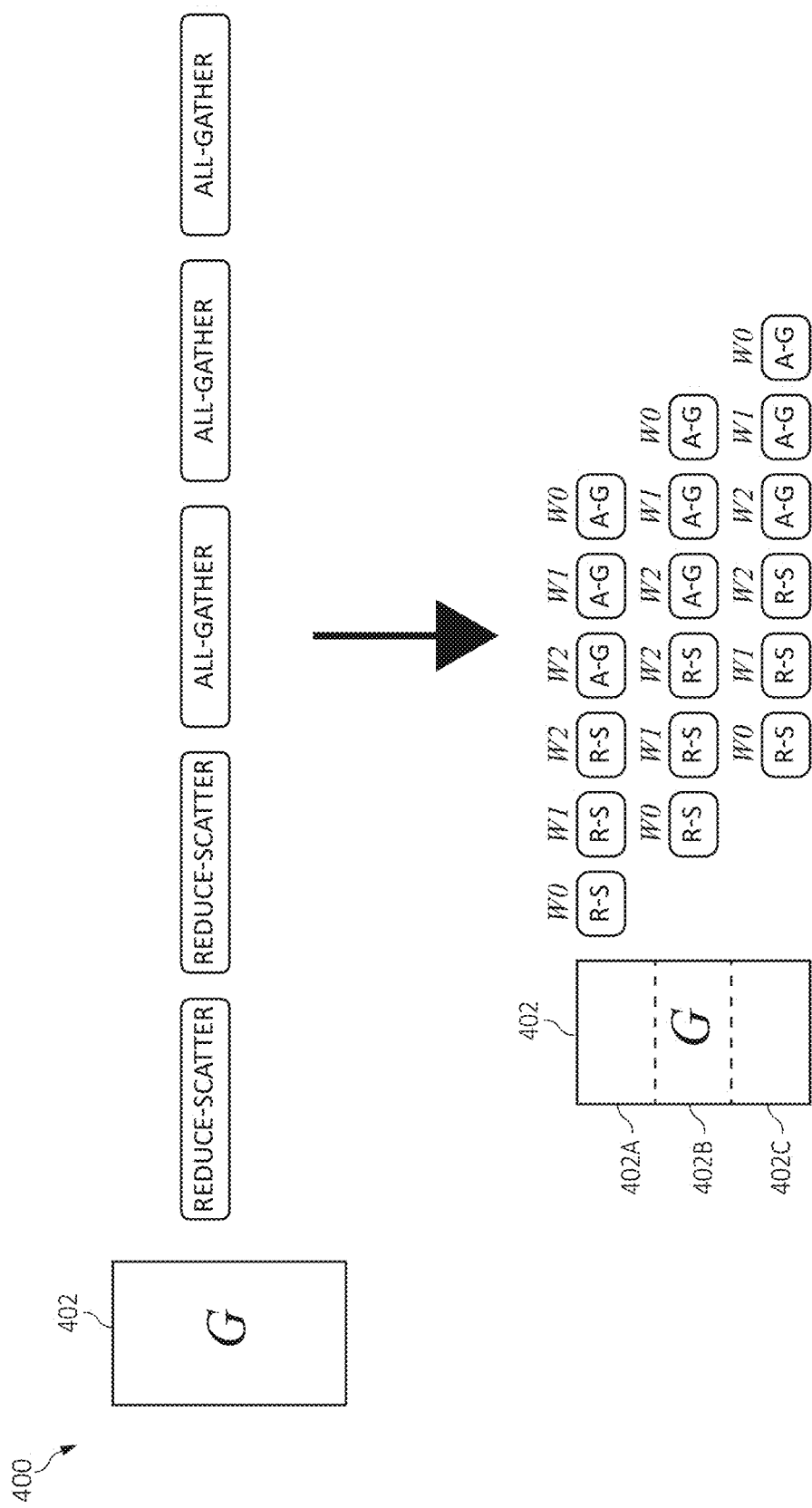
FIG. 4 is an additional block diagram depicting pipelining multi-directional reduction according to an embodiment of the present invention.

Turning now to FIG. 4, a block diagram depicting exemplary functional components 400 according to various mechanisms of the illustrated embodiments, is shown. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes (such as various computer systems) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16, although such components are not depicted for illustrative convenience.

As depicted, FIG. 4 depicts a pipelining multi-directional reduction method 400. The pipelining multi-directional reduction method 400 includes dividing up data 402 ("G") into data partitions such as, for example, data partitions 402A, 402B, and 402C. That is, a set of partitions 402A, 402B, and 402C including one or more data elements may be created. An allreduce operation may be performed. The allreduce may include a number of reduce scatter operations ("reduce-scatter" or "R-S") and a number all-gather ("A-G") operations. The number of reduce scatter operations and a number of all-gather operations may be equal to a number of independent networks (e.g., network fabrics). That is, a single reduce scatter operation and all-gather operation may be divided/broken up according to a number of the independent networks such as, for example, W0, W1, and W2. In FIG. 4, three reduce scatter and three all-gather operations are created as equal to the three independent networks W0, W1, and W2. Hence, the reduce scatter operations and the all-gather operations may be assigned to each of the independent networks. The serialized execution order of each of the one or more reduce scatter operations and the one or more all-gather operations for each of the plurality of independent networks. The reduce scatter operations and the one or more all-gather operations may sequentially execute in each of the plurality of independent networks according to a serialized execution order and a defined time period.

For example, a first reduce scatter may be performed by W0 in a first stream for data partition 402A, a second reduce scatter is performed by W1 in the first stream/first layer for data partition 402A, and a third reduce scatter is performed by W2 in the first stream/first layer for data partition 402A. At this point, a first all-gather operation (according to a dependency/sequential order) is performed by W2 in the first stream/first layer for data partition 402A, a second all-gather operation is performed by W1 in the first stream/first layer for data partition 402A, and a third all-gather operation is performed by W0 in the first stream/first layer for data partition 402A.

Upon the first reduce scatter being completed in W0 in the first stream/first layer for data partition 402A, the first reduce scatter may be performed by W0 in the second stream/second layer for data partition 402B. This is because W0 is available for use upon completion of the first reduce scatter completed in W0 in the first stream for data partition 402A. The same dependencies and operations as explained above may be applied in the second stream/second layer for data partition 402B. That is, a second reduce scatter is performed by W1 in the second stream/second layer for data partition 402B, and a third reduce scatter is performed by W2 in the second stream/second layer for data partition 402A. A first all-gather operation (according to a dependency/sequential order) is performed by W2 in second stream/second layer r for data partition 402B, a second all-gather operation is performed by W1 in the second stream/second layer for data partition 402B, and a third all-gather operation is performed by W0 in the second stream/second layer for data partition 402B.

Upon the first reduce scatter being completed in W0 in the second stream/second layer for data partition 402C, the first reduce scatter may be performed by W0 in the third stream/third layer for data partition 402C. This is because W0 is available for use upon completion of the first reduce scatter completed in W0 in the third stream/third layer for data partition 402A. The same dependencies and operations as explained above may be applied in the third stream/third layer for data partition 402C. That is, a second reduce scatter is performed by W1 in the third stream/third layer for data partition 402C, and a third reduce scatter is performed by W2 in the second stream/second layer for data partition 402A. A first all-gather operation (according to a dependency/sequential order) is performed by W2 in second stream/second layer r for data partition 402C, a second all-gather operation is performed by W1 in the third stream/third layer for data partition 402C, and a third all-gather operation is performed by W0 in the second stream/second layer for data partition 402C.

It should be noted, as illustrated in the example of FIG. 4, the first reduce scatter being completed by W0 in the second stream/second layer for data partition 402B may occur while the second reduce scatter is being executed by W1 in the first stream/first layer for data partition 402A. Also, the first reduce scatter being completed by W0 in the third stream/second layer for data partition 402C may occur while the second reduce scatter is being executed by W1 in the second stream/second layer for data partition 402B and while the third reduce scatter is being executed by W2 in the first stream/first layer for data partition 402A.

In general, the pipelining multi-directional reduction method 400 may commence execution of the one or more reduce scatter operations and the one or more all-gather operations for a first data partition using each of the plurality of independent networks according to the serialized execution order and the defined time period and commence execution of the one or more reduce scatter operations and the one or more all-gather operations for a subsequent data partition using each of the plurality of independent networks according to the serialized execution order and the defined time period upon completion of a first reduce scatter operation in a first independent network.

The pipelining multi-directional reduction method 400 may execute a first reduce scatter operation on a first independent network, execute a second reduce scatter operation on a second independent network upon completion of the first reduce scatter operation, and/or execute an nth reduce scatter operation on an Nth independent network upon completion of the first reduce scatter operation, the second reduce scatter operation, or combination thereof.

In one aspect, the pipelining multi-directional reduction method 400 may also require at least a selected period of time to expire between a reduce scatter operation and an all-gather operation. That is, a time period for executing each reduce scatter and/or each all-gather operation may be defined to require at least the selected period of time to expire (e.g., a time gap must occur between a reduce scatter operation and a subsequent reduce scatter operation).

Figure 5:
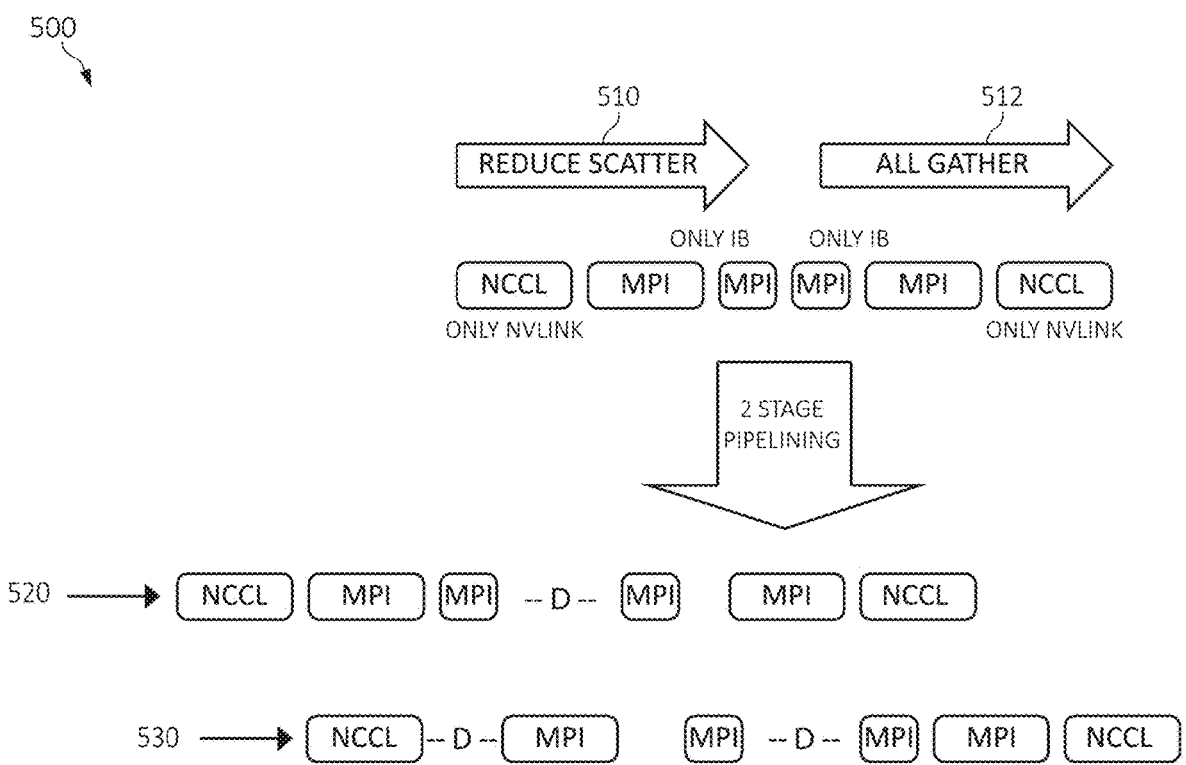
FIG. 5 is an additional block diagram depicting pipelining multi-directional reduction according to an embodiment of the present invention.

Consider the following example illustrated in FIG. 5 of an implementation of the aforementioned functionality of FIG. 4. FIG. 5 depicts a pipelining multi-directional reduction method 500. The pipelining multi-directional reduction method 500 includes performing a reduce scatter operation 510 followed by an all-gather operation 512. However, the reduce scatter operation 510 followed by an all-gather operation 512 may be divided up into a number of operations according to a number of independent networks (e.g., network fabrics) such as, for example, NVIDIA Collective Communications Library (NCCL), a message-passing interface ("MPI"), and an additional MPI and executed in two stage pipelining via streams 520 and 530.

The pipelining multi-directional reduction method 400 may execute a current reduce scatter operation on a selected one of the plurality of independent networks such as, for example, the NCCL in stream 520. A subsequent reduce scatter operation may be executed on a next available one of the plurality of independent networks such as, for example, MPI upon completion of the current reduce scatter operation on the NCCL in stream 520. Next, a third reduce scatter operation may be executed on an additional MPI followed by expiration of a selected time period delay in stream 520. Following the expiration of a selected time period "D", a first all-gather operation may be performed again on the additional MPI upon expiration of the selected time period "D". A second all-gather operation may be performed in stream 520 using the MPI. Upon completion of the second all-gather operation performed in stream 520 using the MPI, a subsequent all-gather operation performed by the NCCL in stream 520.

As depicted, upon completion of the current reduce scatter operation the NCCL in stream 520, a first current reduce scatter operation may be performed using the NCCL in stream 530, followed by a time period delay ("D") prior to commencing execution of a second reduce scatter operation using the MPI in stream 530. A third reduce scatter operation may be performed using the MPI in stream 530 and, again, followed by a time period delay ("D") prior to commencing execution of a first all-gather operation using the MPI in stream 530. A second all-gather operation using the MPI in stream 530 followed by a third all-gather operation using the NCCL in stream 530.

In one aspect, calculations (e.g., scoring or ranking) may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 6:
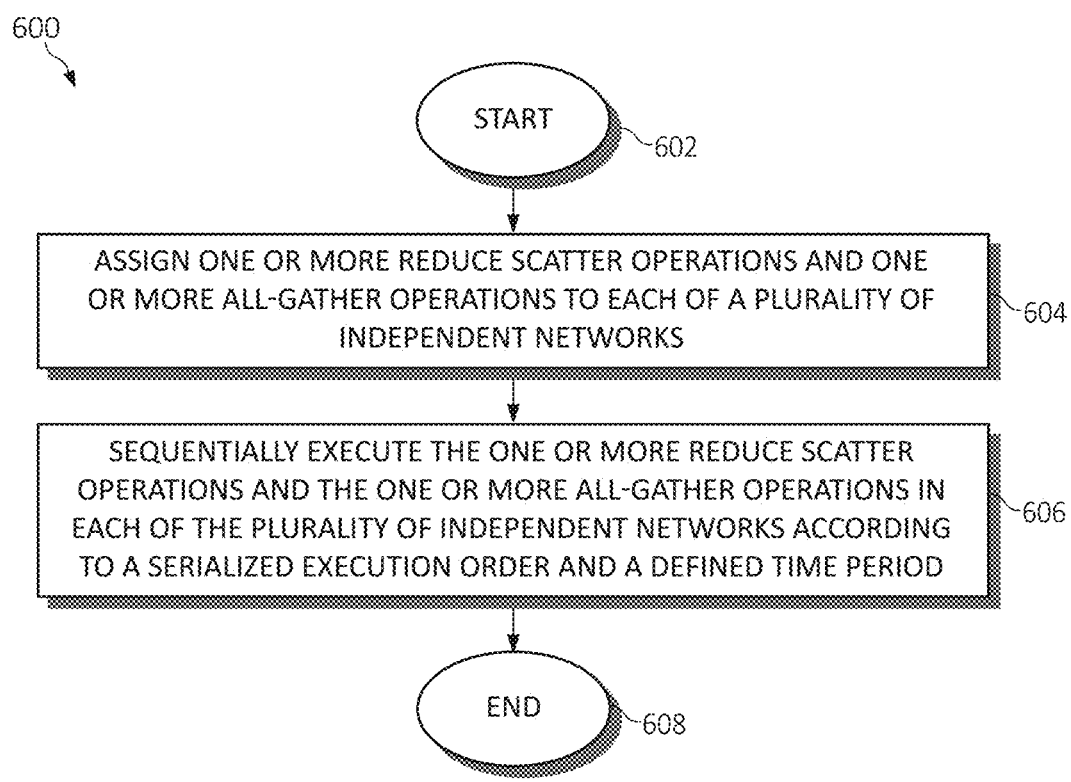
FIG. 6 is a flowchart diagram depicting an exemplary method for pipelining multi-directional reduction in a computing environment according to an embodiment of the present invention by a processor, in which aspects of the present invention may be realized.

Turning now to FIG. 6, a method 600 for pipelining multi-directional reduction in a computing environment by a processor is depicted, in which various aspects of the illustrated embodiments may be implemented. That is, FIG. 6 is a flowchart of an additional example method 600 for pipelining multi-directional reduction in a computing environment according to an example of the present technology. The functionality 600 may be implemented as a method executed as instructions on a machine, where the instructions are included on at least one computer readable medium or one non-transitory machine-readable storage medium. The functionality 600 may start in block 602.

One or more reduce scatter operations and one or more all-gather operations may be assigned to each of a plurality of independent networks, as in block 604. The one or more reduce scatter operations and the one or more all-gather operations may be sequentially executed in each of the plurality of independent networks according to a serialized execution order and a defined time period, as in block 606. The functionality 600 may end, as in block 608.

Figure 7:
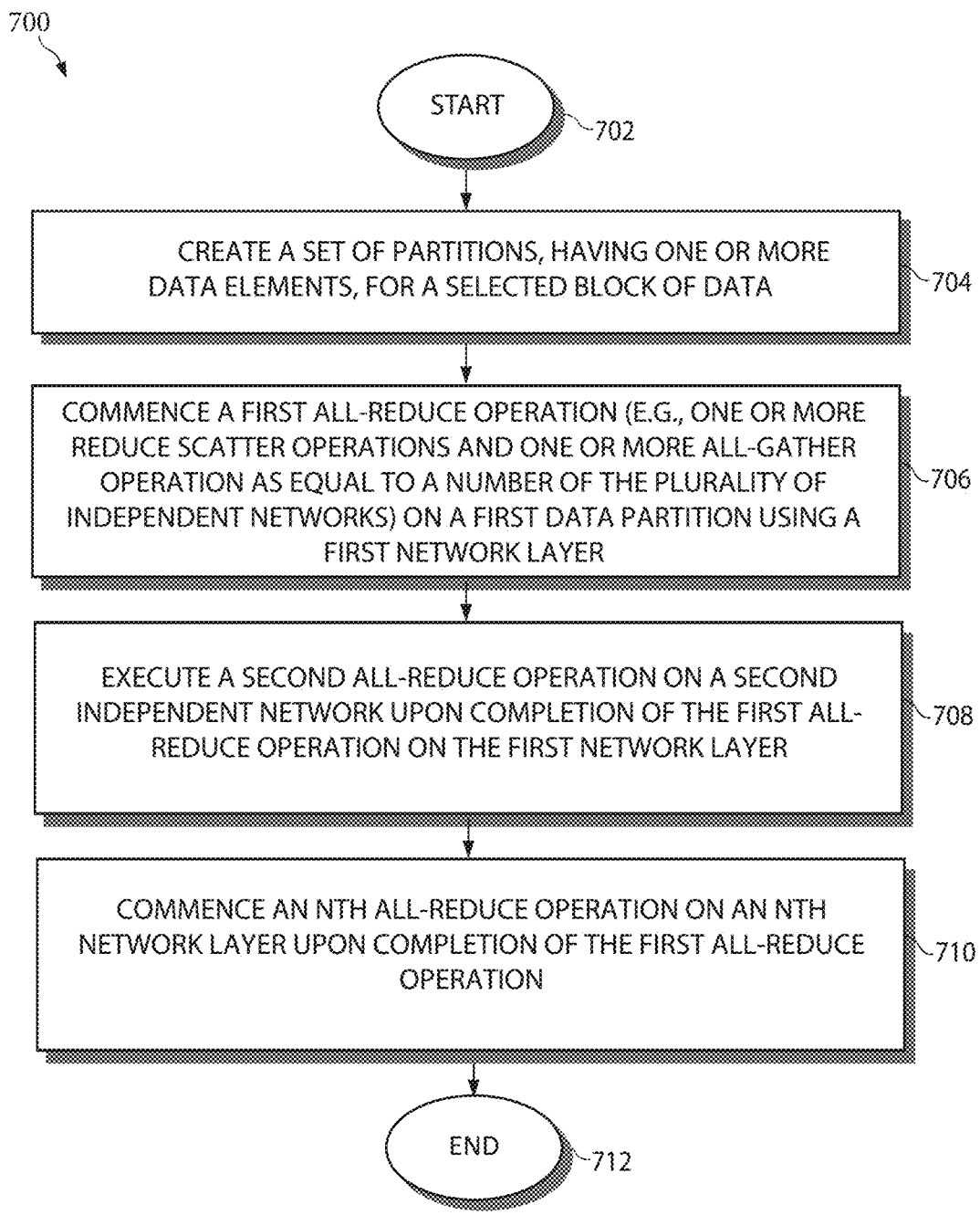
FIG. 7 is a flowchart diagram depicting an exemplary method for pipelining multi-directional reduction in a computing environment according to an embodiment of the present invention by a processor, in which aspects of the present invention may be realized.

Turning now to FIG. 7, a method 700 for pipelining multi-directional reduction in a computing environment by a processor is depicted, in which various aspects of the illustrated embodiments may be implemented. That is, FIG. 7 is a flowchart of an additional example method 900 for pipelining multi-directional reduction in a computing environment according to an example of the present technology. The functionality 700 may be implemented as a method executed as instructions on a machine, where the instructions are included on at least one computer readable medium or one non-transitory machine-readable storage medium. The functionality 700 may start in block 702.

A set of partitions, having one or more data elements, may be created for a selected block of data, as in block 704. A first all-reduce operation (e.g., one or more reduce scatter operations and one or more all-gather operation as equal to a number of the plurality of independent networks) may be commenced on a first data partition using a first network layer, as in block 706. A second all-reduce operation may be executed on a second independent network upon completion of the first all-reduce operation on the first network layer, as in block 708. An nth all-reduce operation on an Nth network layer may be commenced upon completion of the first all-reduce operation, as in block 710. The functionality 700 may end, as in block 712.

In one aspect, in conjunction with and/or as part of at least one block of FIGS. 6-7, the operations of 600 and 700 may include each of the following. The operations of 600 and 700 may define the time period to require at least a selected period of time to expire between a reduce scatter operation and an all-gather operation, and/or define the time period to require at least a selected period of time to expire between a reduce scatter operation and a subsequent reduce scatter operation.

The operations of 600 and 700 may create a set of partitions including one or more data elements, define a number of reduce scatter operations and a number all-gather operations as equal to a number of the plurality of independent networks, and/or define the serialized execution order of each of the one or more reduce scatter operations and the one or more all-gather operations for each of the plurality of independent networks.

The operations of 600 and 700 may execute a current reduce scatter operation on a selected one of the plurality of independent networks, and/or execute a subsequent reduce scatter operation on a next available one of the plurality of independent networks upon completion of the current reduce scatter operation and expiration of a selected time period.

The operations of 600 and 700 may commence execution of the one or more reduce scatter operations and the one or more all-gather operations for a first data partition using each of the plurality of independent networks according to the serialized execution order and the defined time period and/or commence execution of the one or more reduce scatter operations and the one or more all-gather operations for a subsequent data partition using each of the plurality of independent networks according to the serialized execution order and the defined time period upon completion of a first reduce scatter operation in a first independent network.

In an additional aspect, the operations of 600 and 700 may execute a first reduce scatter operation on a first independent network, execute a second reduce scatter operation on a second independent network upon completion of the first reduce scatter operation, and/or execute an nth reduce scatter operation on an Nth independent network upon completion of the first reduce scatter operation, the second reduce scatter operation, or combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for pipelining multi-directional reduction in a computing environment, comprising:
    assigning one or more reduce scatter operations and one or more all-gather operations to each of a plurality of independent networks comprising respective network fabrics; and
    sequentially executing the one or more reduce scatter operations and the one or more all-gather operations in each of the plurality of independent networks according to a serialized execution order and a time period, wherein the serialized execution order and the time period is based on requiring fewer transmissions between those of the respective network fabrics being least efficient.

2. The method of claim 1, further including:
    defining the time period to require at least a selected period of time to expire between a reduce scatter operation and an all-gather operation; or
    defining the time period to require at least a selected period of time to expire between a reduce scatter operation and a subsequent reduce scatter operation.

3. The method of claim 1, further including:
    creating a set of partitions including one or more data elements; and
    defining a number of reduce scatter operations and a number all-gather operations as equal to a number of the plurality of independent networks.

4. The method of claim 1, further including defining the serialized execution order of each of the one or more reduce scatter operations and the one or more all-gather operations for each of the plurality of independent networks.

5. The method of claim 1, further including:
    executing a current reduce scatter operation on a selected one of the plurality of independent networks; and
    executing a subsequent reduce scatter operation on a next available one of the plurality of independent networks upon completion of the current reduce scatter operation and expiration of the time period.

6. The method of claim 1, further including:
    commencing execution of the one or more reduce scatter operations and the one or more all-gather operations for a first data partition using each of the plurality of independent networks according to the serialized execution order and the time period; and
    commencing execution of the one or more reduce scatter operations and the one or more all-gather operations for a subsequent data partition using each of the plurality of independent networks according to the serialized execution order and the time period upon completion of a first reduce scatter operation in a first independent network.

7. The method of claim 1, further including:
    executing a first reduce scatter operation on a first independent network;
    executing a second reduce scatter operation on a second independent network upon completion of the first reduce scatter operation; or
    executing an nth reduce scatter operation on an Nth independent network upon completion of the first reduce scatter operation, the second reduce scatter operation, or combination thereof.

8. A system for pipelining multi-directional reduction in a computing environment, comprising:
    one or more computers with executable instructions that when executed cause the system to:
        assign one or more reduce scatter operations and one or more all-gather operations to each of a plurality of independent networks comprising respective network fabrics; and
        sequentially execute the one or more reduce scatter operations and the one or more all-gather operations in each of the plurality of independent networks according to a serialized execution order and a time period, wherein the serialized execution order and the time period is based on requiring fewer transmissions between those of the respective network fabrics being least efficient.

9. The system of claim 8, wherein the executable instructions further:

define the time period to require at least a selected period of time to expire between a reduce scatter operation and an all-gather operation; or define the time period to require at least a selected period of time to expire between a reduce scatter operation and a subsequent reduce scatter operation.

10. The system of claim 8, wherein the executable instructions further:

create a set of partitions including one or more data elements; and define a number of reduce scatter operations and a number all-gather operations as equal to a number of the plurality of independent networks.

11. The system of claim 8, wherein the executable instructions further define the serialized execution order of each of the one or more reduce scatter operations and the one or more all-gather operations for each of the plurality of independent networks.

12. The system of claim 8, wherein the executable instructions further:

execute a current reduce scatter operation on a selected one of the plurality of independent networks; and execute a subsequent reduce scatter operation on a next available one of the plurality of independent networks upon completion of the current reduce scatter operation and expiration of the time period.

13. The system of claim 8, wherein the executable instructions further:

commence execution of the one or more reduce scatter operations and the one or more all-gather operations for a first data partition using each of the plurality of independent networks according to the serialized execution order and the time period; and commence execution of the one or more reduce scatter operations and the one or more all-gather operations for a subsequent data partition using each of the plurality of independent networks according to the serialized execution order and the time period upon completion of a first reduce scatter operation in a first independent network.

14. The system of claim 8, wherein the executable instructions further:

execute a first reduce scatter operation on a first independent network;

execute a second reduce scatter operation on a second independent network upon completion of the first reduce scatter operation; or execute an nth reduce scatter operation on an Nth independent network upon completion of the first reduce scatter operation, the second reduce scatter operation, or combination thereof.

15. A computer program product for, by a processor, pipelining multi-directional reduction in a computing environment, the computer program product comprising a non-transitory computer-readable storage medium having computer-readable program code portions stored therein, the computer-readable program code portions comprising:

an executable portion that assigns one or more reduce scatter operations and one or more all-gather operations to each of a plurality of independent networks comprising respective network fabrics; and an executable portion that sequentially executes the one or more reduce scatter operations and the one or more all-gather operations in each of the plurality of independent networks according to a serialized execution order and a time period, wherein the serialized execution order and the time period is based on requiring fewer transmissions between those of the respective network fabrics being least efficient.

16. The computer program product of claim 15, further including an executable portion that:

defines the time period to require at least a selected period of time to expire between a reduce scatter operation and an all-gather operation; or defines the time period to require at least a selected period of time to expire between a reduce scatter operation and a subsequent reduce scatter operation.

17. The computer program product of claim 15, further including an executable portion that:

creates a set of partitions including one or more data elements; and defines a number of reduce scatter operations and a number all-gather operations as equal to a number of the plurality of independent networks; and defining the serialized execution order of each of the one or more reduce scatter operations and the one or more all-gather operations for each of the plurality of independent networks.

18. The computer program product of claim 15, further including an executable portion that:

executes a current reduce scatter operation on a selected one of the plurality of independent networks; and executes a subsequent reduce scatter operation on a next available one of the plurality of independent networks upon completion of the current reduce scatter operation and expiration of the time period.

19. The computer program product of claim 15, further including an executable portion that:

commences execution of the one or more reduce scatter operations and the one or more all-gather operations for a first data partition using each of the plurality of independent networks according to the serialized execution order and the time period; and commences execution of the one or more reduce scatter operations and the one or more all-gather operations for a subsequent data partition using each of the plurality of independent networks according to the serialized execution order and the time period upon completion of a first reduce scatter operation in a first independent network.

20. The computer program product of claim 15, further including an executable portion that:

executes a first reduce scatter operation on a first independent network;

executes a second reduce scatter operation on a second independent network upon completion of the first reduce scatter operation; or executes an nth reduce scatter operation on an Nth independent network upon completion of the first reduce scatter operation, the second reduce scatter operation, or combination thereof.

* * * * *